United States Patent [19]

Saint-Lébe et al.

[11] 4,115,146
[45] Sep. 19, 1978

[54] PROCESS FOR THE DEPOLYMERIZATION OF STARCH BY IRRADIATION AND PRODUCTS SO OBTAINED

[75] Inventors: Louis Saint-Lébe, Aix-en-Province; Gérard Berger, Maisons-Alfort; Jean-Pierre Michel, Aix-en-Provence; Michel Huchette; Guy Fléche, both of Lestrem, all of France

[73] Assignees: Commissariat a l'Energie Atomique, Paris; Roquette Freres, Lestrem, both of France

[21] Appl. No.: 736,208

[22] Filed: Oct. 27, 1976

[30] Foreign Application Priority Data

Oct. 30, 1975 [FR] France ............................ 75 33245

[51] Int. Cl.² ........................ C13K 1/06; C13L 1/08; C08L 3/00; B01J 1/10
[52] U.S. Cl. ................................... 127/38; 106/213; 127/33; 127/36; 127/71; 204/160.1
[58] Field of Search ............... 127/32, 33, 36, 38, 127/69, 71; 106/210; 204/160.1

[56] References Cited

U.S. PATENT DOCUMENTS

| | | | |
|---|---|---|---|
| 2,867,571 | 1/1959 | Bellamy | 204/160.1 X |
| 3,203,885 | 8/1965 | Meiners et al. | 204/160.1 X |
| 3,224,903 | 12/1965 | Commerford et al. | 127/71 X |
| 3,352,773 | 11/1967 | Schwartz et al. | 204/160.1 |

OTHER PUBLICATIONS

*Staerke*, vol. 25, No. 6, 1973, France, Berger; G., Agenel, J.P., Saint-Lebe, L., "Identification and Determination of Sugars formed during Irradiation of Corn Starch," pp. 203–210.

*Primary Examiner*—Morris O. Wolk
*Assistant Examiner*—Roger F. Phillips
*Attorney, Agent, or Firm*—Larson, Taylor and Hinds

[57] ABSTRACT

Process for depolymerizing starch by irradiation in which granular starch, whose water content is at the most about 23%, is subjected, in the presence of an acid which is neutralized at the end of the treatment, to a dose of radiation which is a function of the nature and of the quantity of the acid used.

14 Claims, No Drawings

PROCESS FOR THE DEPOLYMERIZATION OF STARCH BY IRRADIATION AND PRODUCTS SO OBTAINED

The present invention which is due to the work of Messieurs Louis Saint-Lébe, Gérard Berger and Jean-Pierre Michel of the Commissariat à l'Energie Atomique and of Messieurs Michel Huchette and Guy Fleche of Roquette Freres, relates to a process for the depolymerisation of starch by irradiation.

It also relates, and this by way of new industrial products, to the products obtained by the application of said process.

Numerous industries, for example the paper, textile and adhesive industries, consume considerable and ever increasing amounts of depolymerised starch in the form of starch glues. Another important outlet for the depolymerised starch is the food industry.

Methods of depolymerising starch generally used until now are dextrinification, alkaline oxidation and acid fluidification.

Dextrinification which consists of depolymerising starch in the dry phase under the action of an acid catalyst involves heavy handling and checking operations as well as high manufacturing costs notably by reason of the cost price of the energy used.

Alkaline oxidation, notably by hypochloride solution and acid fluidification, notably by means of HCl, occur in the moist phase, the raw material being a starch milk. The major drawbacks of these two processes reside in the loss of yield as a result of the loss, in the filtering operations, of a portion of the products obtained which are solubilised and, consequent upon this loss of yield, in contributing to the pollution problems by the processing factories.

Techniques of depolymerisation by irradiation of starch have also already been proposed. These techniques consider the use of gamma rays; it has been proposed to combine them with subsequent processing consisting of alkaline dispersion of the irradiated product.

None of the processes based on irradiation techniques is exploited industrially both on account of the insufficiency of the results recorded, — it is to be noted on this subject that there is a low level of soluble products or solubles present in the irradiated product — and of the generally prohibitive cost price of the processing.

It was a particular object of the inventors to overcome these drawbacks and to provide a process for depolymerising starch by irradiation responding better to the various requirements of the industries than pre-existing processes.

Their researches have enabled them to find that, unexpectedly and surprisingly, the irradiation of a granular starch whose water content is at most about 23%, in the presence of an acid, enabled the depolymerisation of the starch and the appearance of a high proportion of solubles to be achieved — especially constituted by products of the dextrin type of low molecular weight and comprising also compounds with a small molecule (notably aldehydes and organic acids) — using doses of irradiation sufficiently low for the processing to remain competitive as regards cost price with respect to the conventional depolymerisation processes.

The process according to the invention is, consequently, characterised by the fact that granular starch of which the water content is at the most about 23%, is subjected, in the presence of an acid, which is neutralised at the end of the process, to a dose of radiation which is a function of the nature and of the amount of the acid used and which is generally less than 3 Mrad, the temperature being, preferably, ambient temperature and the duration of the processing sufficient to achieve the required level of depolymerisation.

In a preferred embodiment of said process, the acid is constituted by a strong mineral or inorganic acid; other mineral acids as well as certain organic acids, for example the chloracetic acids, particularly trichloracetic acid being also contemplatable.

Again according to a preferred embodiment, the radiation applied is gamma radiation, more particularly from $^{60}Co$ or from $^{137}Cs$; the use of accelerated electrons is also contemplatable; the energy level of these electrons must be comparable to the energy level of the gamma radiation source.

The acidity can be neutralised by means of an alkaline agent namely an alkaline metal or earth-alkaline metal salt such as sodium carbonate or sodium bicarbonate; the quantity of alkaline agent is equivalent to the stoichiometrical quantity; the agent is in form of finely divided dry powder. The granulometry of this powder is chosen in order that the contact between the starch particles and the particles of alkaline agent is quickly obtained; generally speaking the granulometry of the particles of alkaline agents will be comparable with the granulometry of the starch particles (10 $\mu$ in the case of corn starch or waxy corn starch and 40 $\mu$ in the case of tuber starch.

The new industrial products provided by the invention are characterised by the fact that they have the texture, the composition as well as the physical and chemical properties of those which are obtained by the application of the above-defined process.

The invention presents other features which are preferably used at the same time and which will be more explicitly considered below.

It will, in any case, be understood by means of the additional description which follows and the accompanying Examples, said description and Examples relating to preferred embodiments of the invention.

In order to depolymerise starch according to the invention, procedure is as follows or in equivalent manner.

Granular starch, whose water content is practically neighbouring that of commercial starch [that is to say 13% where cereal starch is concerned (for example corn, waxy corn and the like) and 20% where tuber starch is concerned (for example potatoes, manioc and the like)] and in any case less than about 23%, is subjected to irradiation treatment in the presence of an acid.

The choice of the above-said water content rests essentially on considerations of an economic nature, theoretically better results — which has been proved by experiments which will be considered below — having been obtained by working on dry starches, the advantages thus obtained being however more than eliminated by the necessary expense of energy to lower the water content of the commercial starch.

The acid is placed in the presence either directly with the granular starch whose water content is that of commercial starch, or with a starch milk.

The acid is generally a strong mineral acid, selected preferably from the group comprising HCl, $H_2SO_4$, $H_3PO$, and $HNO_3$. To facilitate contact with the starch, the acid, for example hydrochloric acid, is utilised, in the form of a concentrated solution, notably 1N to 10N, whether granular starch or starch milk is concerned.

To produce as homogeneous an effect as possible when operating with granular starch, the acid solution can be sprayed over the starch for example in a mixing installation.

The amount of acid placed in contact depends on the acidification ratio that it is desired to achieve. In general, it is arranged for the acidification ratio to be from $1.10^{-2}.H^+$ to $40.10^{-2}.H^+$ and preferably, from 3 to $20.10^{-2}.H^+$ (it being recalled that this acidification ratio is defined by the amount of $H^+$ ions per kg of anhydrous starch), which necessitates, by way of example for the above-said preferred domaine, 3 to 20 g of 32% technical hydrochloric acid per kg of anhydrous starch.

To the extent that the contacting of the starch and the acid is effected during a processing step independant of the irradiation treatment, which is the case generally, the starch which has been contacted with the acid is subsequently transported, after drying if necessary, to the inside of an irradiation cell enclosing the source of radiation; the acidified starch can be introduced herein in its normal and final wrapping.

The source of radiation is generally constituted by $^{60}Co$ or $^{137}Cs$.

The starch to be irradiated, in bulk or placed inside its wrapping for instance polyethylene and kraft paper bags) is then arranged on a device of the sample distribution device type which is disposed so that the starch receives a homogeneous dose of radiation, the homogeneity being of the order of ± 10%. The period of exposure is such that the starch receives the required dose of radiation; the extent of this duration may be determined from the characteristics of the installation and the intensity of the source.

In general, a prior calibration is effected, notably by a method of Fricke (described in the Journal Officiel de la Republique Francaise, of Dec. 12, 1972 at p. 12 794) enabling the dose of irradiation for a given period of irradiation to be defined. An a posteriori check is carried out by the oxalic acid method [see the following publications: 1 Draganic: "Recent work on the uses of oxalic acid in aqueous solutions or in solid state for chemical dosimetry in multimegarad region". Proceedings of the second Tihany symposium on radiation chemistry. Budapest (1966) p. 139 and 2: Draganic et B. L. Gupta: "Current tendency in chemical dosimetry". Proceedings of the symposium on dosimetry, biology and medicine IAEA (Vienna) 1973, p. 351].

By way of illustrative example of the foregoing considerations, it is to be indicated that a certain number of experiments have been carried out by means of an irradiation cell within which were placed six balls of stainless steel of 5 cm diameter each containing 2000 curies of $^{60}Co$; the geometry used for this cell was such that the delivery rate of the dose received was 150 krad/hour ± 5%.

More generally, it is to be indicated that the conclusions drawn from the experiments carried out by the inventors have led the latter to provide for a dose delivery rate of about 0.1 to about 1 $Mrad/h^{-1}$, the results being dispersed very little for this range of dose delivery rate which is that of industrial irradiators.

More generally still, the inventors have noted the existence of a direct relationship between a given acidification ratio and the corresponding irradiation level necessary to arrive at a given degree of depolymerisation. This relationship is illustrated by the following examples. It has thus been possible to show that the dose of irradiation indispensable for obtaining a given degree of depolymerisation varies inversely with respect to the acidification ratio.

Another of the parameters studies by the inventors is the influence of temperature on the yield of the irradiation operation.

Corresponding experiments, certain of which will be described below, have shown that in fact the yield increases with temperature. If, despite this observation, the recommended temperature is preferably ambient temperature, notably in the vicinity of 15° C, this is only for economic considerations. In fact, by carrying out the irradiation treatment at about 15° C, results are obtained comparable with those obtainable by conventional treatments described earlier, only if the temperature were 140°–180° C. In other words, the increase in yield of the process according to the invention to be expected by operating at 25°, 35° or 45° C, is insufficient to compensate for the drawbacks resulting from the need to apply a considerable amount of energy to bring the reaction medium to these temperatures.

The neutralisation treatment is generally performed by means of anhydrous $Na_2CO_3$ in form of a powder, the granulometry of which is comparable to the granulometry of the starch involved; its quantity is equivalent to the stoichiometrical quantity. Ammonia has also been successfully used. The neutralization is performed after the depolymerization treatment. The intimate mixture of starch and alkaline agents may be performed by means of an installation of the mixer type.

As regards the depolymerisation products obtained by the application of the above-said process, they are novel. They comprise up to 70% of soluble products, especially constituted by products of the low molecular weight dextrin type and also include small molecule compounds (notably aldehydes and organic acids).

Besides these "solubles", the products contained certain macromolecules.

The advantageous properties of the novel products, which properties will be illustrated in the following Examples, are due in particular to the ratio by weight of the above-said dextrins and the macromolecules present. By means of adjustment of the irradiation parameters, it is possible to vary the abovesaid ratio as well as the proportion of solubles and, consequently, the properties of the depolymerisation products obtained, notably as regards viscosity.

At present, a certain number of experiments and numerical Examples carried out by the inventors and illustrating the invention well, will be described in detail.

1—Influence of the Acidification Ratio

In this first group of experiments, the inventors have studied the influence on the properties of the depolymerisation products obtained, of the variation of the acidification ratio of the treated starches, the irradiation dose remaining constant.

It will first be recalled that the contacting of the acid and of starch can be done either on to a starch milk, or on to a granular starch.

As far as the first alternative is concerned, various starch milks were prepared, namely a corn starch milk, a waxy corn starch milk and a potato starch milk. The corn starch and waxy corn starch used as raw materials were of 13% water content (moisture content of the commercial product), whereas for the potato starch it was 20% by weight of water (also commercial content).

To manufacture the above-said milks, there were placed in suspension respectively 27 kg of corn starch and of waxy corn starch and 35.7 liters of water, which resulted in a milk of about 21° Baume. For the potato starch milk, there was also placed in suspension 29.4 kg of potato starch in 33.3 liters of water resulting also in a milk of about 21° Baume.

The three milks were of 37.5% dry material (d.m.)

They are denoted below by the symbols A 13 1, A 13 2 and A 13 3 as regards the three first ones, by W 13 1, W 13 2 and W 13 3 as regards the three following ones and by F 20 1, F 20 2 and F 20 3 as regards the three last ones, the letters A, W and F enabling the nature of the starch to be identified, the mention 13 or 20 being the moisture level of the starch starting material and the figures 1, 2 and 3 for each group the order number of the starch milk studied.

By means of a solution of 32% hydrochloric acid, nine samples were treated, the three specimens of each group being acidified at ratios increasing from the first to the third sample by increasing from one specimen to the following one the amount of HCl solution entering into the reaction (namely 254 g for the first, 460 g for the second, and 660 g for the third). After 30 minutes of contact, the milk is filtered and then dried in a pneumatic drier to a water content of 13% for the cereal starches and 20% for the tuber starches. The acidity fixed in the starch granules is determined indirectly by titration of the remaining acidity; to do this, conventional acidimetric titration is used. The corresponding acidity ratios calculated are collected in the following table I, expressed in $H+.10^{-2}$/kg of anhydrous starch.

If it is desired to effect the contacting of the starch and the acid by using granular starch, the samples of 27 kg of corn starch or of waxy corn starch are introduced into a mixer and there is intimately incorporated with them, by spraying, respectively 102 g, 184 g and 264 g of technical hydrochloric acid, which leads to the respective acidification ratios of $3.8.10^{-2}.H^+$/kg of anhydrous starch, $6.9.10^{-2}.H^+$/kg and $9.9.10^{-2}.H^+$kg.

The samples, previously contacted with acid, were transported to the inside of an irradiation cell containing a radiation source constituted by 12000 curies of $^{60}Co$ and, at ambient temperature of 15° C, they were kept for 6 hours and 14 minutes or for 1 hour and 40 minutes at respectively 150 and 600 krad/hour, so that the irradiation dose absorbed by the nine samples was 1 Mrad ± 5%.

The acidity is neutralized by means of anhydrous $Na_2CO_3$ in the form of a powder, whose granulometry is comparable to the granulometry of each starch sample. The quantities of $Na_2CO_3$ used for the neutralization of the above defined nine samples A 13 1 to F 20 3 are respectively 88.5g, 160g, 230g, 83.5g, 158g, 227g, 91g, 175g and 237g.

The percentage of "solubles" present in the thus irradiated samples was determined by applying a process according to which 40 g of the product is mixed with 200 g of water, at ordinary temperature, with stirring, for 1 hour, followed by filtration. The dry material in the filtrate is determined and the percentage of solubles is thus obtained. Their Brabender viscosity is then determined by using a Brabender viscosimeter marketed by the Brabender Company under the designation "V S 6". In the table shown below, there is given in the third column the level of solubles and the maximum peak of the viscosity recorded at a concentration of 30% of dry material with a dynamometric box of 350 cm-g at the speed of 75 rpm.

TABLE I

| Samples | Acidity ($H^+.10^{-2}.kg^{-1}$) | Solubles (%) | Viscosity peak (Brabender units) |
|---|---|---|---|
| A 13 1 | 3.8 | 0.8 | not recordable (too viscous) |
| A 13 2 | 6.9 | 4.1 | 100 |
| A 13 3 | 9.9 | 7.2 | 50 |
| W 13 1 | 3.6 | 1.7 | 120 |
| W 13 2 | 6.8 | 9.2 | 50 |
| W 13 3 | 9.8 | 18.0 | 40 |
| F 20 1 | 3.9 | 4.1 | 2400 |
| F 20 2 | 7.5 | 2.3 | 210 |
| F 20 3 | 10.2 | 3.5 | 30 |

The conclusions which it is possible to draw from the figures assembled in Table I are that:
the viscosity decreases when the acidity ratio increases,
the level of solubles increases with the acidity ratio in the case of corn and waxy corn starches.

2—Influence of Water Content of the Starch

Three groups of three samples of starch milk identical with those of the group of experiments of Example 1 are acidified to the same ratio and under the same conditions as mentioned above.

They are then dried, after filtration, to a residual moisture level of 5%. The identification symbols of the nine samples are deduced immediately from those of Example 1 by simply substituting the previous humidity level by 5.

The nine samples are subjected to the same irradiation treatment as in Example 1 and in the same manner as indicated in Example 1 and after neutralisation with the same quantities of $Na_2CO_3$, their solubles level as well as the Brabender viscosity is determined.

The results obtained are collected in Table II below.

TABLE II

| Samples | Acidity ($H^+.10^{-2}.kg^{-1}$) | Solubles (%) | Viscosity peak (Brabender units) |
|---|---|---|---|
| A 51 | 3.8 | 8 | 330 |
| A 52 | 6.9 | 31 | 100 |
| A 53 | 9.9 | 50 | 50 |
| W 51 | 3.6 | 45 | 50 |
| W 52 | 6.8 | 52 | 20 |
| W 53 | 9.8 | 48 | 10 |
| F 51 | 3.9 | 34 | 80 |
| F 52 | 7.5 | 49 | 30 |
| F 53 | 10.2 | 51 | 10 |

The figures collected in this table, make it possible to deduce, taking into account also the results recorded within the scope of the first group of experiments, that the decrease in water content of the irradiated starch is accompanied by a notable increase in the solubles level.

Now, the higher the proportion of solubles, the lower is the viscosity; hence the starches thus treated are useful within the scope of applications requiring low viscosity.

3—Influence of the Irradiation Dose

In a third group of experiments, the inventors studied the influence of the irradiation dose on the properties of the depolymerisation products obtained by the application of the process according to the invention.

In a first phase, two groups of four samples of potato starch milk with 37.5% of dry material were contacted with acid using a solution of hydrochloric acid of 32% concentration.

Utilising 29.4 kg of potato starch having a water content of 20%, it was necessary to add successively 120 g of hydrochloric acid for the first acidity, 314 g for the second, 562 g for the third and 681 g for the fourth. The milk was then filtered and the cake, with 40% moisture, dried in a conventional drier.

The acidity ratios thus obtained appear in the second column of Table 3, in the first column of which the 8 samples are identified by using symbols of the same type as those described in Example 1.

The eight acidified samples were dried to a residual moisture content of 20% then subjected inside an irradiation cell as described with respect to Example 1, as regards the samples of the first group, to an irradiation treatment corresponding to a dose of 1 Mrad and, as regards the samples of the second group, to an irradiation treatment corresponding to a dose of 2.5 Mrad.

The temperature was ambient temperature, namely about 15° C during the irradiation treatment.

The acidity of the four samples of each group is then neutralised under the above defined conditions by means of the above defined $Na_2CO_3$, the quantities of which were respectively 41 g, 109 g, 195 g and 236 g for each sample of each group.

On the eight irradiation samples, the solubles level was determined as well as the Brabender viscosity in the manner indicated in Example 1, the concentration of dry material for the determination of the maximum viscosity peak being however 20% (the "maximum viscosity peak" is the maximum value, expressed in Brabender units, of the viscosity of a given starch glue, as regards the measurements carried out within the scope of the Examples relating to the present description, at the temperature of 92° C).

The results are assembled in the following Table III.

TABLE III

| Samples | Acidity ($H^+.10^{-2}.kg^{-1}$) | Dose = 1 Mrad Solubles (%) | Dose = 1 Mrad Viscosity (Brabender units) | Dose = 2,5 Mrad Solubles (%) | Dose = 2,5 Mrad Viscosity (Brabender units) |
|---|---|---|---|---|---|
| F 204 | 1.8 | 0 | not recordable | | |
| F 205 | 4.7 | 3.2 | 1 400 | | |
| F 206 | 8.4 | 2.9 | 120 | | |
| F 207 | 10.2 | 3.6 | 20 | | |
| F 208 | 1.8 | | | 0.3 | 4 470 |
| F 209 | 4.7 | | | 0.4 | 900 |
| F 210 | 8.4 | | | 3.1 | 80 |
| F 211 | 10.2 | | | 5.5 | 10 |

From the results collected in this table, it is possible to conclude that, when the irradiation dosing increases the solubles level increases and the viscosity drops.

4—Influence of Temperature

Within the scope of the fourth group of experiments, the inventors have studied the influence of temperature during the irradiation treatment.

The tests were carried out using two samples of acidified potato starch, which were obtained in the same way as the samples F 207 and F 2011 of the preceding group of experiments; those two samples had the symbols F2012 and F 2013.

These two samples were subjected, within a device of the type used in the preceding experiments, to a dose of 1 Mrad, the temperature being kept at 15° C for the first sample, and at 50° C for the second.

In the same way as with Example 1 and after neutralisation with 236 g $Na_2CO_3$ for each sample the solubles level and the Brabender viscosity were determined, (maximum peak corresponding to the concentration of 20% of dry material).

The results are assembled in Table IV below; it is possible to deduce therefrom that the solubles level does not vary whilst the viscosity drops when the applied temperature increases.

TABLE IV

| Samples | Temperature °C | Acidity ($H^+.10^{-2}.kg^{-1}$) | Solubles (%) | Viscosity (Brabender units) |
|---|---|---|---|---|
| F 2012 | 15 | 10.2 | 4.7 | 200 |
| F 2013 | 50 | 10.2 | 4.9 | 30 |

Below, there is indicated, by means of numerical examples, some applications of starches depolymerised according to the invention.

5—Use of the Products According to the Invention, as a Textile Sizing

In the manner indicated in Example 1, there was prepared a new sample respectively of each of the following types: W 131, A 132, A 133 and A 51.

These samples were irradiated by means of the irradiation cell of Example 1, the dose being 1 Mrad.

From these irradiated samples, there were prepared as many samples of starch glue with 12% dry material.

In addition, two other samples of starch glue with 12% dry material were prepared, using on the one hand corn starch and, on the other hand, potato starch, both having been depolymerised by means of a conventional oxidation depolymerisation treatment.

The solubles levels and the viscosities (maximum Brabender peak at the concentration of 30% of dry material) of the irradiated samples and of those depolymerised by the application of the conventional process (determination according to Example 1) are assembled in Table V.

TABLE V

| Sample | W 131* | A 132* | A 133* | A 51* | Oxidised Tuber Starch | Oxidised Cereal Starch |
|---|---|---|---|---|---|---|
| Solubles (%) | 1.7 | 4.1 | 7.2 | 8.0 | 4.0 | 5.0 |
| Viscosity (Brabender units) | 120 | 100 | 50 | 330 | 1500 | 1100 |

*Values identical with those determined in the preceding experiments

These various samples were applied as textile sizing on white linen cloth and there were recorded, on the one hand, the "deposit" and on the other hand, the "quality" of the sizing.

The results are collected in Table VI below.

In this table
- the "deposit" (which represents the percentage increase in weight of the linen cloth which was held in the glue until equilibrium is achieved) is expressed in percent,
- the "quality" or "judgement" is qualified by a variable proportional number of crosses; this is the flexibility of the cloth judged by "touch" after drying.

TABLE VI

| Type of product | Deposit % | Judgement |
|---|---|---|
| Oxidised cereal starch | 15 | + |
| Oxidised tuber starch | 12 | ++ |
| A 132 | 11 | ++++ |
| A 133 | 15.6 | ++++ |
| A 51 | 15.6 | ++++ |
| W 131 | 15.7 | ++ |

The conclusion which can be drawn from the results assembled in Table VI is that products depolymerised by irradiation show properties, which are comparable or even superior to conventional starches, within the scope of their use as textile sizings.

6—Application of the Products According to the Invention as Sizing of the Semi-Permanent Type, That is to Say Resistant to a Certain Number of Launderings In the manner indicated in Example I, three samples of the type W 51, W 132 and W 133 respectively were prepared; these samples were subjected to the same irradiation and neutralisation treatments as in the preceding experiments in which they have already been described and their properties (solubles level in % and viscosity in Brabender units) were those already indicated above.

In parallel manner, there was prepared by acid fluidification of an acetylated corn starch, an acetylated starch whose percentage of solubles was 2% and which had a maximum Brabender viscosity peak of 1500 Brabender units at a concentration of 15% of dry material.

For the four samples, the Brookfield viscosity at 50° C and at 100 rpm was also measured.

By means of these four samples, glues were prepared with 15% of dry material containing about 40 g/l of melamine-formaldehyde resin and 6 g/l of NH$_4$Cl. After depositing these glues on a linen-cloth of "blue" quality, the latter was dried for 3 minutes at 130° C and then subjected to thermo-fixing at 170° C for 30 seconds.

The linen-cloth was then subjected to several launderings and the amount of starch lost was recorded. In Table VII below, are indicated the percentages of starch remaining in each case as well as the Brookfield viscosity of the glue obtained with each sample studied.

TABLE VII

| Sample | "deposit" | 1st laundering | 2nd laundering | 3rd laundering | 4th laundering | 5th laundering | Brookfield Viscosity (in cp) |
|---|---|---|---|---|---|---|---|
| acetylated starch | 10.2 | 98.7 | 92.3 | 90.8 | 87.4 | 78.6 | 140 |
| W 51 | 10.5 | 80.9 | 74 | 69 | 65 | 56.7 | 7 |
| W 132 | 10.6 | 94.3 | 90.5 | 86.2 | 78.1 | 61.1 | 7 |
| W 133 | 10.2 | 89.5 | 80.8 | 74.2 | 72.6 | 71.1 | 5 |

The conclusion that can be drawn from this table is that despite very low viscosity in the case of irradiated glues in comparison with the viscosity of the conventional glue, the losses on laundering are however satisfactory. Consequently, depolymerisation by irradiation enables the application of products of very low viscosity to be envisaged enabling the achievement of what is called in the trade, semi-permanence in their use as sizings.

7—Application of the Products According to the Invention to the Surface Sizing of Paper Three samples of starch depolymerised by irradiation in the presence of a subsequently neutralised acid were prepared, these samples being respectively identical with those identified above by the references A 51, A 133, W 131.

The properties of these starches are hence those which have been indicated already above.

In addition there was prepared by application of a conventional depolymerisation treatment by oxidation, a fourth sample of starch whose properties determined according to Example 1 are:

5% of solubles maximum viscosity at 30% ms: 1100 Brabender units.

By means of the four samples, glues were prepared with 10% of dry material and they were used for surface sizing the "wire-side" and the "felt-side" of a "surface-sized" paper.

In each case the physical characteristics of the treated paper were then determined.

These characteristics are assembled in Table VIII below.

TABLE VIII

| Sample | | Oxidised starch | A 51 | A 133 | W 131 |
|---|---|---|---|---|---|
| Mullen | WS | 23 | 22.1 | 23.1 | 21.9 |
| | FS | 21.8 | 22 | 22.1 | 23 |
| Rupture length Scott | | 5020 | 3928 | 4453 | 4692 |
| Bond Denisson | | 131 | 135 | 128 | 131 |
| | WS | 20 | 20 | 20 | 20 |
| waxes | FS | 20 | 20 | 20 | 18 |
| Cobb | WS | 15 | 13.5 | 13.5 | 12.5 |
| | FS | 14.5 | 11 | 11.5 | 11 |
| Adhesion to inks | WS | 5 | 5 | 5 | 5 |
| K and N | FS | 5 | 5 average penetration less CF | 5 penetration penetration | + strong WS + weak FS | 5 same as oxidised starch |
| Whiteness | WS | 77.2 | 78.8 | 81.6 | 82.9 |
| | FS | 79.7 | 74.6 | 82.2 | 76.8 |

In this table:

WS denotes "wire side"
FS denotes "felt side"
Müllen : breaking strength (AFNOR standard Q 03 014)
Rupture length : tensile strength (AFNOR standard Q 03 004)
Scott Bond : internal cohesion test
Denisson waxes : surface cohesion test (Tappi standard T 459 SU 65)
Cobb : water penetraton resistance (AFNOR standard Q 03 035)
Adhesion to inks : resistance to the migration of acid inks (AFNOR standard Q 03 015)
K and N : determinaton of the surface conditon (Tappi standard em 19).

The results recorded with the irradiated samples are comparable with those obtained with the samples obtained by conventional techniques.

8—Application of the Product According to the Invention to Paper Coating

Two samples of starch depolymerised by irradiation in the presence of a subsequently neutralised acid and corresponding respectively to the types defined above and with the reference numbers F 202 and F 203, were prepared. The properties were those indicated above.

By dextrinification, a dextrin of potato starch was prepared having the following properties:
solubles level: 10%
maximum Brabender viscosity peak: 1050 Brabender units at 32% dry material.

By means of these three samples, three coating pastes were prepared using the following proportions:

| Constituent | Parts by weight |
|---|---|
| Kaolin | 400 |
| Tripolyphosphate | 2.4 |
| Water | 185 |
| Starch specimen | 66 |
| Water | 125 |
| NH$_4$OH | 1.4 |

The sample of starch and water, in the above mentioned formula, are steam-cooked at 95° C for 10 minutes before being added.

By means of the coating formulae thus produced as many paper sheets of surfaced quality were treated.

The finished paper was subjected to the usual tests for determining its physical characteristics.

These characteristics are assembled in the following table.

TABLE IX

| | | Control starch (dextrin type) | F 202 | F 203 |
|---|---|---|---|---|
| Denisson waxes | FS | 7 - 6 | 7 - 6 | 7 - 6 |
| | WS | 7 - 6 | 7 - 6 | 7 - 6 |
| IGT test (water retention with ink 3801 | | average | average | average |
| IGT test (tearing with ink 3803 | WS | 86 | held | 109 |
| | FS | 62 | slight spotting | 70 |

In this table :
the IGT test is a printability test (Tappi standard T 499 SU 64).

The figures assembled in this table show that the results obtained with the starches depolymerised by the application of the process according to the invention are similar to those obtained with starches depolymerised by the chemical method.

9—Acidification with Trichloroacetic Acid

A new sample according to the type A 13 2 as defined in example 1 has been prepared.

This sample has been acidified with trichloracetic acid; the quantity of trichloracetic acid used had a potential acidity which was equal to the acidity obtained by means of hydrochloric acid as described in example 1; this quantity corresponds to 67 m.e.g./kg dry starch.

This sample was submitted to an irradiation of 1 Mrad.

The neutralisation was achieved under the conditions of example 1.

The Brabender viscosity was then determined by means of the method described in example 1.

The viscosity peak at the concentration of 30% of dry material was identical to the peak determined in example 1, i.e. 100 Brabender units.

As a result of which and whatever the embodiment adopted, there is thus provided a process for depolymerising starch whose characteristics emerge sufficiently from the foregoing for it to be unnecessary to dwell further on this subject and which has, with respect to pre-existing processes, numerous advantages, notably:

that of permitting chemical materials and especially energy to be economised, that of not being polluant, the irradiation being effected on the dry material, the solubles formed remaining in the midst of the material, which is manifested by an improved overall yield, that of being easily rendered automatic.

As is self evident and as emerges already from the foregoing, the invention is in no way limited to those of its types of application more particularly envisaged; it encompases, on the contrary, many modifications.

We claim:

1. Process for depolymerising starch by irradiation characterised by the fact that granular starch, whose water content is at the most about 23%, is subjected, in the presence of an acid which is neutralised at the end of the treatment, to a dose of radiation less than 3 Mrad.

2. Process according to claim 1, characterised by the fact that the dose of radiation is applied at ambient temperature and for a sufficient period to result in the desired degree of depolymerisation.

3. Process according to claim 1, characterised by the fact that the acid is selected from the group constituted by strong mineral acids.

4. Process according to claim 1, characterised by the fact that the amount of acid applied is such that the acidification ratio is $1.10^{-2}.H^+$ to $40.10^{-2}.H^+$, preferably from 3 to $20.10^{-2}.H^+$.

5. Process according to claim 2, characterised by the fact that the acid is constituted by an organic acid, particularly a chloracetic acid.

6. Process according to claim 1, characterised by the fact that the contacting of the starch and of the acid is effected prior to the irradiation treatment.

7. Process according to claim 1, characterised by the fact that the contacting of the starch and of the acid and the irradiation treatment are carried out simultaneously.

8. Process according to claim 6, characterised by the fact that the contacting of the acid and the starch is effected by using granular starch.

9. Process according to claim 6, characterised by the fact that it comprises an intermediate drying step, when the contacting of the starch and of the acid is carried out on a starch milk.

10. Process according to claim 1, characterised by the fact that the irradiation treatment is effected by means of gamma radiation.

11. Process according to claim 10, characterised by the fact that the gamma radiation is a radiation from 6oCo or from $^{137}$Cs.

12. Process according to claim 1, characterised by the fact that the irradiation treatment is carried out by means of accelerated electrons.

13. Process according to claim 6, characterised by the fact that the contacting of the acid and the starch is effected by using starch milk.

14. Process according to claim 1, characterised by the fact that the neutralization of the acidity is carried out by means of an alkaline agent selected from an alkaline metal or alkaline earth metal salt.

* * * * *